US011057123B1

(12) United States Patent
Chang et al.

(10) Patent No.: US 11,057,123 B1
(45) Date of Patent: Jul. 6, 2021

(54) TRANSCEIVER AND TRANSCEIVER CALIBRATION METHOD

(71) Applicant: REALTEK SEMICONDUCTOR CORPORATION, Hsinchu (TW)

(72) Inventors: Yuan-Shuo Chang, Hsinchu (TW); Tzu Ming Kao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/925,298

(22) Filed: Jul. 9, 2020

(30) Foreign Application Priority Data

Jan. 6, 2020 (TW) ................................ 109100339

(51) Int. Cl.
*H04B 17/14* (2015.01)
*H04B 17/13* (2015.01)
*H04B 17/00* (2015.01)
*H04B 1/38* (2015.01)

(52) U.S. Cl.
CPC ............. *H04B 17/13* (2015.01); *H04B 1/38* (2013.01); *H04B 17/0085* (2013.01); *H04B 17/14* (2015.01)

(58) Field of Classification Search
CPC ...... H04B 1/38; H04B 17/14; H04B 17/0085; H04B 17/00; H04B 17/10; H04B 17/101; H04B 17/104; H04B 17/11; H04B 17/13–16; H04B 17/19; H04B 17/20; H04B 17/21; H04B 17/24
See application file for complete search history.

(56) References Cited

U.S. PATENT DOCUMENTS

| | | | | |
|---|---|---|---|---|
| 5,293,406 A * | 3/1994 | Suzuki | .................. | H04L 27/364 332/107 |
| 7,248,625 B2 * | 7/2007 | Chien | ...................... | H04B 1/30 375/219 |
| 7,672,364 B2 * | 3/2010 | Kang | ..................... | H04B 17/21 375/221 |
| 7,782,928 B2 * | 8/2010 | Kang | ..................... | H04L 1/243 375/221 |

(Continued)

OTHER PUBLICATIONS

Nassery et al., "Built-In Self-Test of Transmitter I/Q Mismatch and Nonlinearity Using Self-Mixing Envelope Detector," in IEEE Transactions on Very Large Scale Integration (VLSI) Systems, vol. 23, No. 2, pp. 331-341, Feb. 2015, doi: 10.1109/TVLSI.2014.2308 (Year: 2015).*

*Primary Examiner* — James M Perez
(74) *Attorney, Agent, or Firm* — WPAT, P.C. Intellectual Property Attorneys; Anthony King

(57) ABSTRACT

The application discloses a transceiver and a transceiver calibration method. The transceiver includes: a calibration signal generation unit for generating a first test signal and a second test signal to a transmission unit in a gain calibration mode; the transmission unit for generating a combined signal according to the first test signal, the second test signal and a transmission gain; a mixer for performing self-mixing upon the combined signal to generate a self-mixed signal; a receiving unit for generating a receiving signal according to the self-mixed signal; a Fourier transformer for computing a power of the receiving signal at a specific frequency; and a gain calibration unit for adjusting the transmission gain according to the power at the specific frequency in the gain calibration mode.

20 Claims, 6 Drawing Sheets

(56) References Cited

U.S. PATENT DOCUMENTS

| | | | | |
|---|---|---|---|---|
| 8,010,064 B2* | 8/2011 | Kim | H04B 17/14 | 455/115.2 |
| 8,340,167 B2* | 12/2012 | Feng | H04B 17/21 | 375/226 |
| 8,867,596 B2* | 10/2014 | Su | H04B 17/21 | 375/226 |
| 8,897,735 B2* | 11/2014 | Kim | H04B 1/525 | 455/295 |
| 9,000,855 B2* | 4/2015 | Huang | H03L 1/027 | 331/176 |
| 9,036,733 B2* | 5/2015 | Chang | H04L 25/03885 | 375/296 |
| 9,088,319 B2* | 7/2015 | Peng | H03F 1/3241 | |
| 9,203,448 B2* | 12/2015 | Morita | H03F 1/3241 | |
| 9,270,391 B2* | 2/2016 | Wu | H04B 17/14 | |
| 9,344,096 B2* | 5/2016 | Huang | H04B 10/60 | |
| 9,749,172 B2* | 8/2017 | Chang | H04L 27/3863 | |
| 9,780,889 B1* | 10/2017 | Margulis | H04W 56/0035 | |
| 9,780,891 B2* | 10/2017 | Eo | H04B 17/0085 | |
| 10,333,764 B1* | 6/2019 | Arditti Ilitzky | H04B 10/5561 | |
| 10,374,643 B2* | 8/2019 | Wang | H04L 27/364 | |
| 10,374,838 B2* | 8/2019 | Jiang | H03F 1/32 | |
| 10,491,360 B2* | 11/2019 | Liu | H04L 5/14 | |
| 10,498,466 B1* | 12/2019 | Chang | H04B 1/0475 | |
| 10,938,438 B1* | 3/2021 | Chan | H04B 17/0085 | |
| 2003/0095607 A1* | 5/2003 | Huang | H04L 27/368 | 375/296 |
| 2003/0152021 A1* | 8/2003 | Wang | H04L 25/022 | 370/208 |
| 2003/0206603 A1* | 11/2003 | Husted | H04L 27/3863 | 375/324 |
| 2006/0009180 A1* | 1/2006 | Xu | H04B 17/21 | 455/226.1 |
| 2007/0037546 A1* | 2/2007 | Steed, Jr. | H04B 1/28 | 455/334 |
| 2007/0047634 A1* | 3/2007 | Kang | H04L 1/243 | 375/226 |
| 2007/0092023 A1* | 4/2007 | Kang | H04L 27/38 | 375/281 |
| 2007/0123188 A1* | 5/2007 | Mo | H04B 1/30 | 455/302 |
| 2008/0186032 A1* | 8/2008 | Van Bezooijen | H03H 7/40 | 324/646 |
| 2009/0325509 A1* | 12/2009 | Mattisson | H04B 1/525 | 455/75 |
| 2010/0127774 A1* | 5/2010 | Wang | H03F 1/3247 | 330/149 |
| 2010/0159837 A1* | 6/2010 | Dent | H04B 1/525 | 455/63.1 |
| 2011/0075581 A1* | 3/2011 | Mihota | H04B 7/0682 | 370/252 |
| 2011/0075747 A1* | 3/2011 | Mihota | H04B 7/0413 | 375/260 |
| 2011/0076944 A1* | 3/2011 | Mihota | H04L 27/02 | 455/41.2 |
| 2011/0098010 A1* | 4/2011 | Mihota | H04L 27/18 | 455/101 |
| 2012/0213266 A1* | 8/2012 | Su | H04B 17/21 | 375/226 |
| 2012/0294337 A1* | 11/2012 | Kim | H04B 1/525 | 375/219 |
| 2013/0045701 A1* | 2/2013 | Beukema | H03D 1/229 | 455/207 |
| 2013/0258834 A1* | 10/2013 | Mihota | H04B 7/0682 | 370/206 |
| 2014/0016690 A1* | 1/2014 | Chang | H04L 27/3863 | 375/232 |
| 2014/0341263 A1* | 11/2014 | Wu | H04B 17/14 | 375/224 |
| 2015/0229497 A1* | 8/2015 | Dhayni | H04L 25/03159 | 375/219 |
| 2015/0350000 A1* | 12/2015 | Chang | H04L 27/364 | 375/227 |
| 2016/0315648 A1* | 10/2016 | Talty | H04L 1/0071 | |
| 2017/0194990 A1* | 7/2017 | Wang | H04L 27/364 | |
| 2019/0028092 A1* | 1/2019 | Lu | H03K 5/1252 | |
| 2020/0358465 A1* | 11/2020 | Wang | H04B 1/1638 | |

* cited by examiner

TRANSCEIVER AND TRANSCEIVER CALIBRATION METHOD

CROSS REFERENCE TO RELATED APPLICATIONS

This application claims priority of Taiwan application No. 109100339 filed on Jan. 6, 2020, which is incorporated by reference in its entirety.

BACKGROUND

Field of the Invention

The present application relates generally to a transceiver, in particular, to a transceiver capable of self-calibration and an associated transceiver calibration method.

Description of Related Art

Communication system may face the issue of IQ imbalance, and hence, it is necessary to perform phase and amplitude mismatch calibration for the in-phase and orthogonal paths of the transmitter. Generally, when IQ calibration is performed, the gains of the transmitter and the receiver are set at default values; however, the gain of the transmitter and receiver may change due to changes in the process, voltage, and temperature, which affects the linearity and/or signal-to-noise ratio, which in turn affects the IQ calibration result, and therefore, a method for calibrating the gain is required to address the above-mentioned issue.

BRIEF SUMMARY OF THE INVENTION

Some embodiments of the present application provide a transceiver, including: a calibration signal generation unit, configured to generate a first test signal and a second test signal to a transmission unit in a gain calibration mode; the transmission unit, configured to generate a combined signal according to the first test signal, the second test signal and a transmission gain; a self-mixer, configured to perform self-mixing to the combined signal to generate a self-mixing signal; a receiving unit, configured to generate a receiving signal according to the self-mixing signal; a first Fourier transformer, configured to calculate a power of the receiving signal at a specific frequency; and a gain calibration unit, configured to adjust the transmission gain according to the power of the specific frequency in the gain calibration mode.

Some embodiments of the present application provide a transceiver calibration method, including: generating a first test signal and a second test signal in a gain calibration mode; generating a combined signal according to the first test signal, the second test signal and a transmission gain; performing self-mixing to the combined signal and generating a self-mixing signal; generating a receiving signal according to the self-mixing signal; calculating a power of the receiving signal at a specific frequency; and adjusting the transmission gain mode according to the power of the specific frequency in the gain calibration mode.

The transceiver and transceiver calibration method of the present application is capable of calibrating a gain, so as to increase signal-to-noise ratio without sacrificing linearity.

BRIEF DESCRIPTION OF THE DRAWINGS

Aspects of the present disclosure are best understood from the following detailed description when read with the accompanying drawings. It is noted that, in accordance with the common practice in the field, various features are not drawn to scale. In fact, the dimensions of the various features may be arbitrarily increased or reduced for the purpose of discussion.

DETAILED DESCRIPTION

Figure 1:
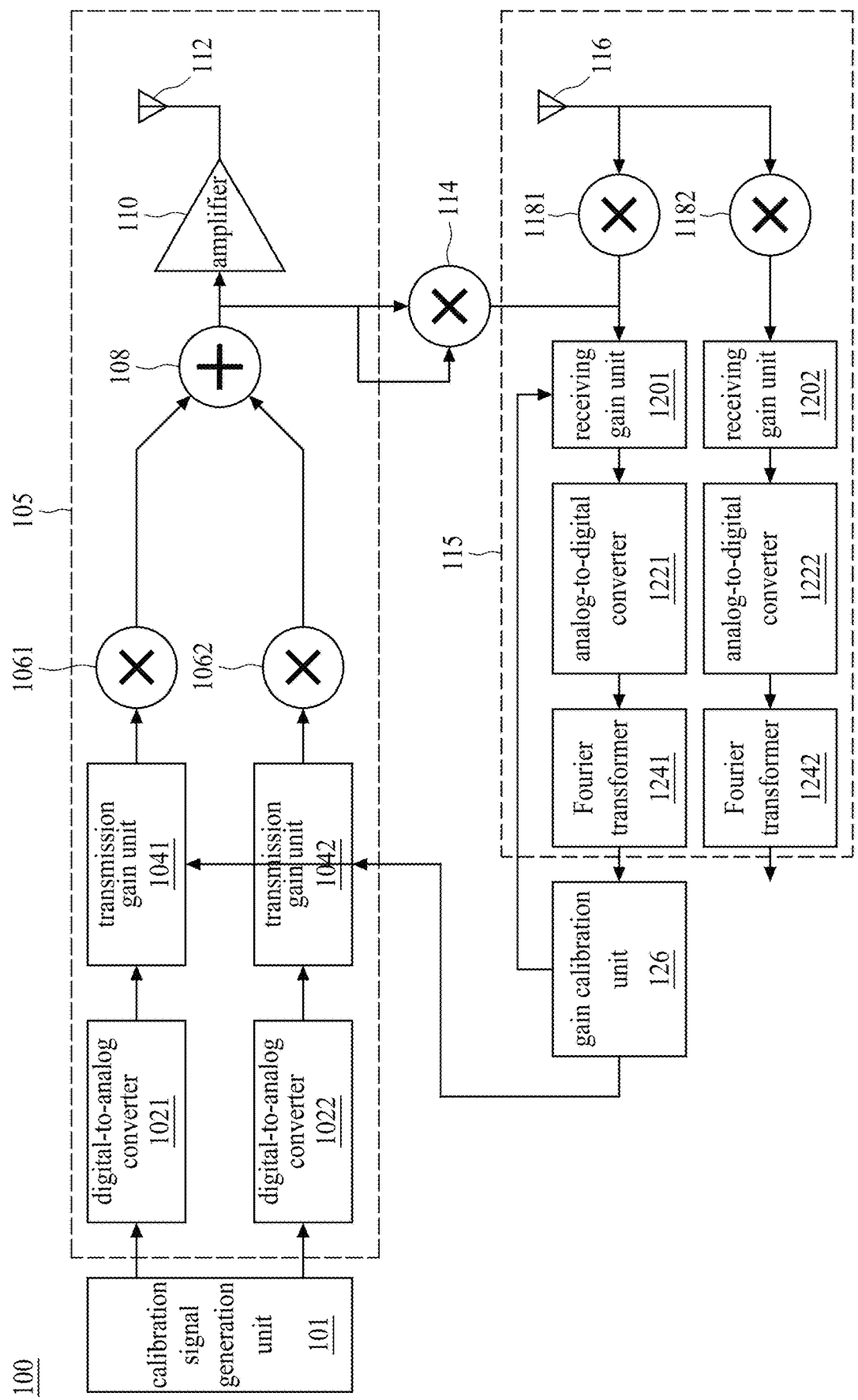
FIG. 1 is a schematic diagram illustrating a transceiver according to embodiments of the present application.
Figure 2:
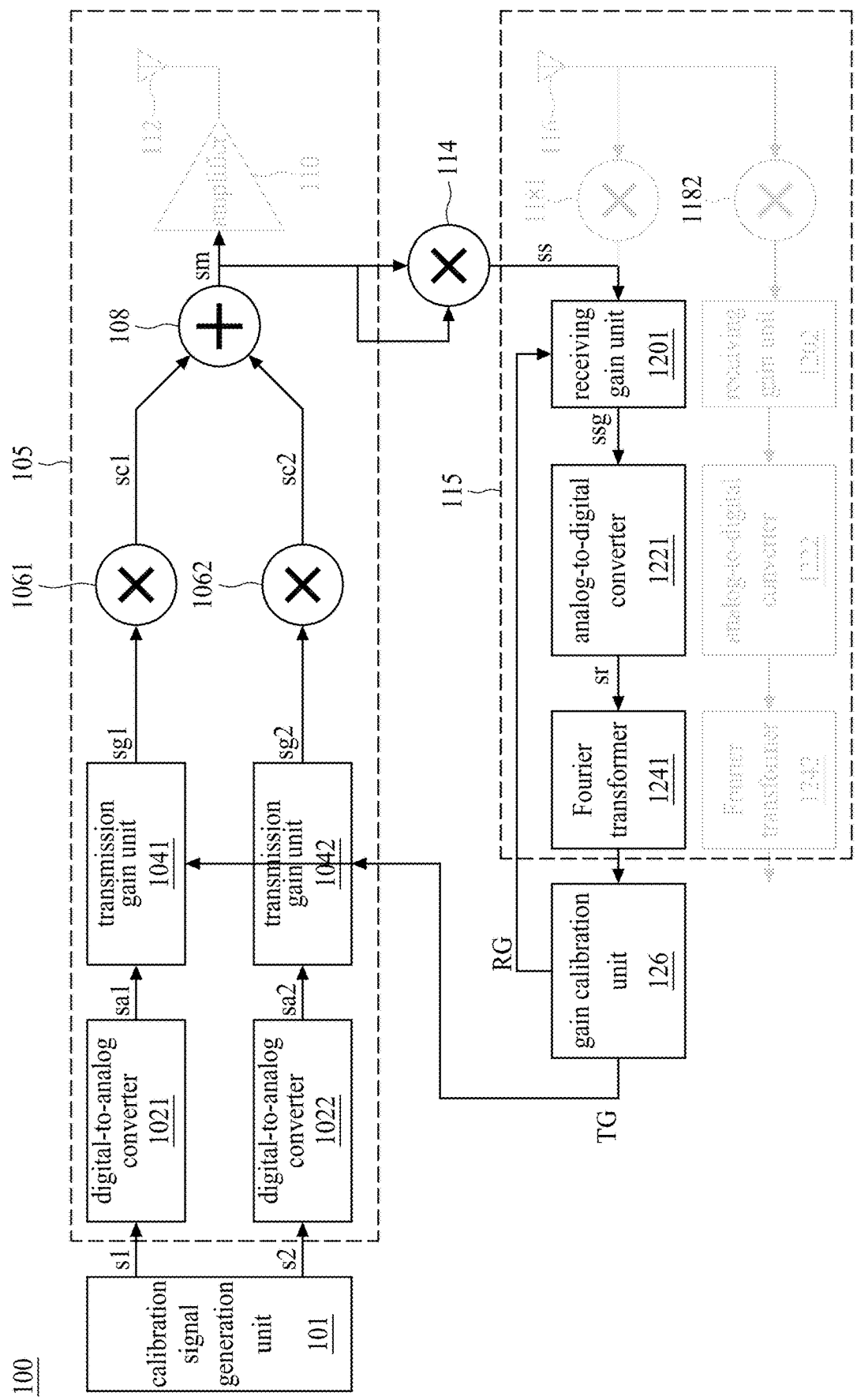
FIG. 2 is a schematic diagram illustrating the operation of the transceiver in a calibration mode according to embodiments of the present application.
Figure 3:
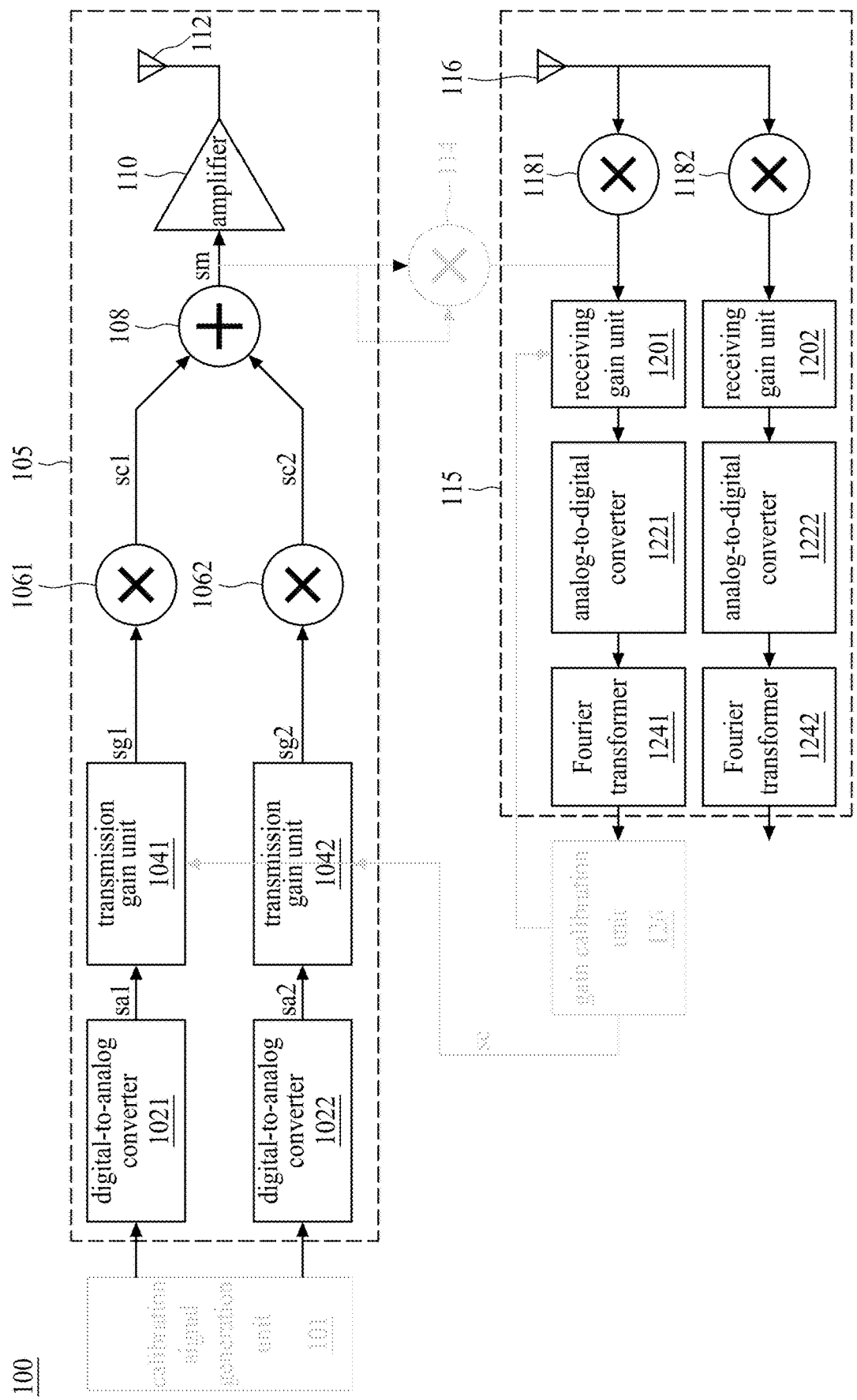
FIG. 3 is a schematic diagram illustrating the operation of the transceiver in a normal mode according to embodiments of the present application.

FIG. 1 is a schematic diagram illustrating a transceiver according to embodiments of the present application. The transceiver 100 can adjust the transmission gain TG of the transmission unit 105 and the receiving gain RG of the receiving unit 115 in a gain calibration mode, and perform IQ imbalance calibration based on the calibrated transmission gain TG and receiving gain RG in an IQ calibration mode, and then enters a normal mode. It should be noted that in the gain calibration mode, only a portion of the transmission unit 105 and receiving unit 115 is used; as shown in FIG. 2, the components that are in use are shown in black, whereas those are not in use are shown in grey; for example, components in grey may be switch-off, or components in grey are not switched-off but instead the sources of the signals are switched using a selector (not shown in the drawing); the operation condition of the transceiver 100 in the normal mode is shown in FIG. 3; similarly, the components that are in use are shown in black, whereas those are not in use are shown in grey. The calibration of the transceiver 100 is discussed below.

The calibration signal generation unit 101 is configured to generate test signals s1 and s2 to the transmission unit 105 in the calibration mode, whereas in the Q calibration mode and the normal mode, the other signal generate unit (not shown in the drawing) is used to generate the in-phase signal and orthogonal signal, wherein the in-phase signal and the orthogonal signal have the same frequency and a phase difference therebetween is 90 degrees. In the transmission unit 105, the digital-to-analog converter 1021, the transmission gain unit 1041 and the up-converter 1061 belong to the in-phase signal transmission path; the digital-to-analog converter 1022, the transmission gain unit 1042 and the up-converter 1062 belong to the orthogonal signal transmission path. In the receiving unit 115, the down-converter 1181, the receiving gain unit 1201, the analog-to-digital converter 1221 and the Fourier transformer 1241 belong to the in-phase signal receive path; the down-converter 1182, the receiving gain unit 1202, the analog-to-digital converter 1222 and the Fourier transformer 1242 belong to the orthogonal signal receive path.

The digital-to-analog converters 1021 and 1022 respectively perform digital-to-analog conversion to the input digital signals to obtain analog signals sa1 and the sa2 (hereinafter, the signals sa1 and sa2); for example, in the calibration mode, the digital signals are test signals s1 and s2 (see, FIG. 2); in the IQ calibration mode and the normal mode, the digital signals are the in-phase signal and the orthogonal signal (not shown in FIG. 3). The transmission gain units 1041 and 1042 respectively provide a gain to signals sa1 and sa2 according to transmission gain TG, thereby generating post-gain signals sg1 and sg2 (hereinafter, the signals sg1 and sg2). The up-converter 1061 and the 1062 respectively up-convert the signal sg1 and sg2 (hereinafter, the signals sc1 and sc2) according to the carrier angular frequency ωc, thereby generating up-converted signals sc1 and sc2, and the combiner 108 combines the signals sc1 and sc2 into a combined signal sm.

In the normal mode, the amplifier 110 amplifies the combined signal sm and the antenna 112 transformed the amplified signal into a transmission signal, e.g., a radio frequency signal; the antenna 116 of the receiving unit 115 receives a transmission signal from a remote transceiver, wherein the transmission signal is unloaded from the carrier angular frequency ωc using down-converters 1181 and 1182 and then transmitted to the in-phase signal receiving path and the orthogonal signal receive path, as shown in FIG. 3.

In the gain calibration mode, as shown in FIG. 2, the self-mixer 114 performs self-mixing to the combined signal sm and generates a self-mixing signal ss; also, a portion of the in-phase signal receiving path or the orthogonal signal receiving path of the receiving unit 115 is used to form an internal return. For example, the receiving gain unit 1201 provides a gain to the self-mixing signal ss according to a receiving gain RG so as to generate a post-gain self-mixing signal ssg, and then the analog-to-digital converter 1221 performs analog-to-digital conversion to the post-gain self-mixing signal ssg to obtain a receiving signal sr; the Fourier transformer 1241 then calculates the power of the receiving signal sr at a specific frequency, and the gain calibration unit 126 adjusts the transmission gain TG of the transmission gain units 1041 and 1042 and the receiving gain RG of the receiving gain unit 1201 according to the power of the specific frequency in the gain calibration mode.

Figure 4:
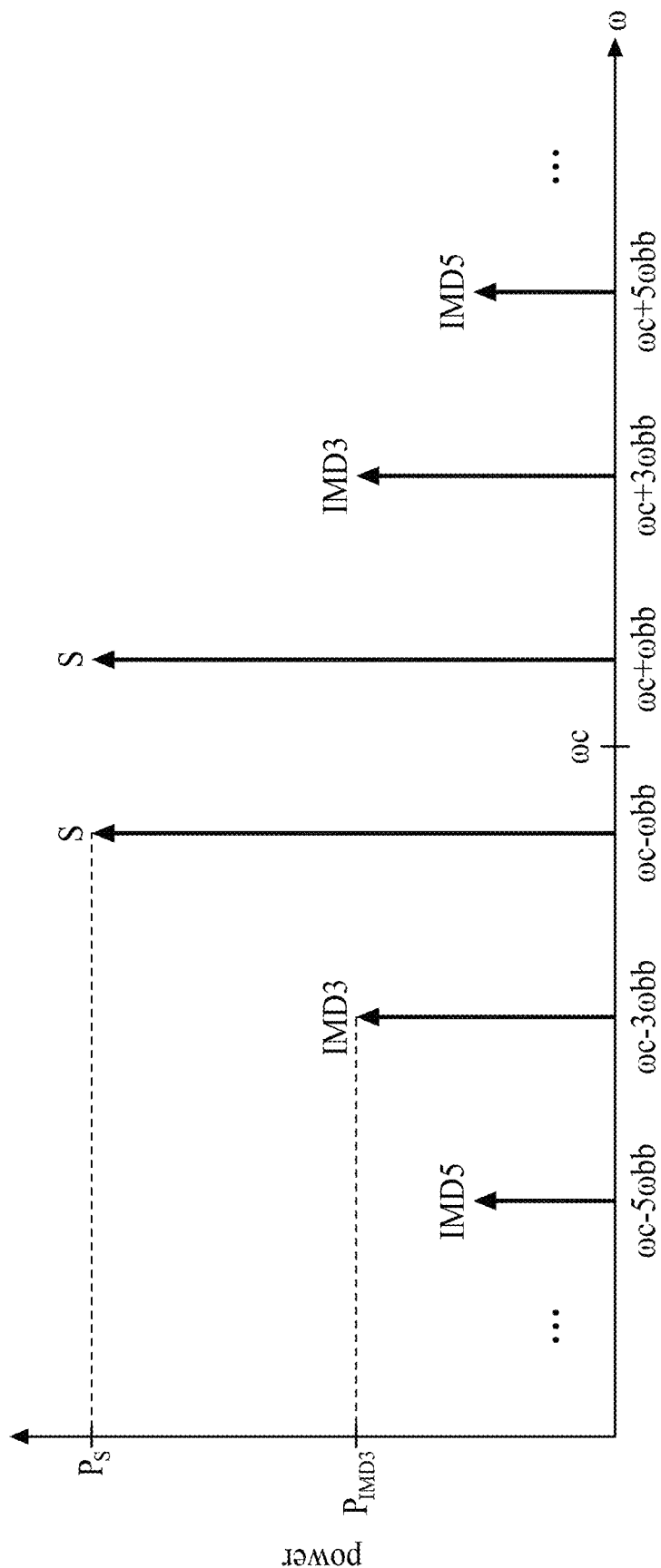
FIG. 4 is a spectrogram of a combined signal in the calibration mode.

The test signals s1 and s2 generated by the calibration signal generation unit 101 cause the combined signal sm to have two-tone main signals S, as shown in FIG. 4, two-tone main signals S are shown on two sides of the carrier angular frequency ωc, wherein the angular frequencies of the two-tone main signals S are ωc+ωbb and ωc−ωbb, respectively, and the power is $P_S$. When the transmission gain TG of the transmission gain units 1041 and 1042 is too big and cases the linearity of the signals sg1 and sg2 distorted, intermodulation distortion (IMD) signals are generated by the combined signal sm, wherein among the IMD signals, the signals with the greatest power are two-tone third-order IMD (IMD3) signals, with frequencies of ωc+3ωbb and ωc−3ωbb, respectively; the signals with the second-greatest power among the IMD signals are two-tone fifth-order IMD (IMD5) signals, with frequencies of ωc+5ωbb and ωc−5ωbb, respectively, and so on. Although the angular frequency is used in FIG. 2, it may be converted to frequency as well. The present invention does not pose other limitations to the content of the test signals s1 and s2, as long as they can generate the two-tone main signals S; for example, one of the test signals s1 and s2 is set as an in-phase signal cos(ωbb·t) or an orthogonal signal sin (ωbb·t), and the other of the test signals s1 and s2 is set as 0.

Figure 5:
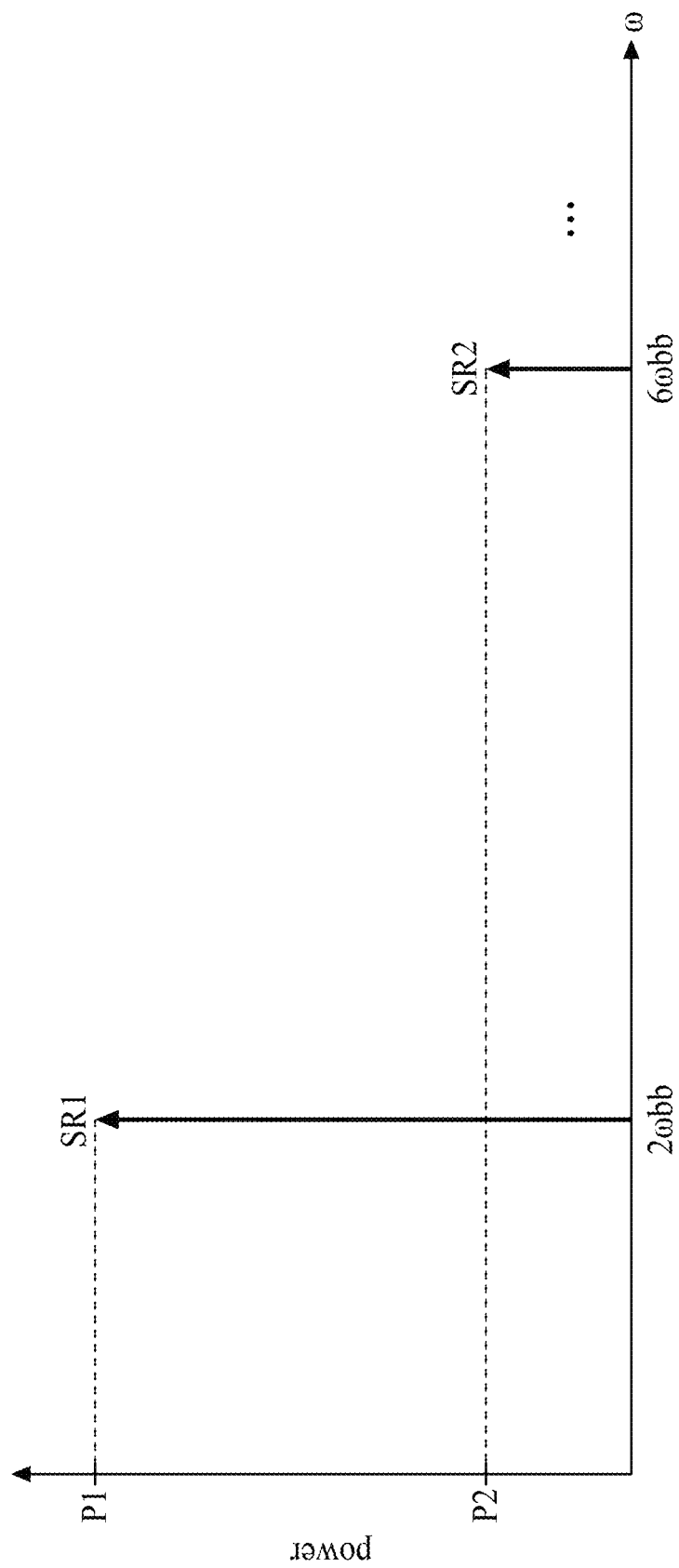
FIG. 5 is a spectrogram of a self-mixing signal in the calibration mode.

FIG. 5 is a spectrogram of a self-mixing signal ss in the calibration mode, as shown in the drawing, a first reference signal SR is observed when the angular frequency is two-fold of the carrier angular frequency ωbb (i.e., 2ωbb), wherein the power P1 of the first reference signal SR1 is approximately $P_S^2+2P_SP_{IMD3}$; a second reference signal SR2 is observed when the angular frequency is six-fold of the carrier angular frequency ωbb (i.e., 6ωbb), wherein the power P2 of the second reference signal SR2 is approximately $P_{D}z$ (it should be noted that, for the sake of brevity, only the power of the IMD3 signals with the greatest power among the IMD signals are listed above in the foregoing discussion regarding the power P1 and the P2). When increasing the gain TG of the transmission gain units 1041 and 1042, the power $P_S$ of the two-tone main signals S would increase, and therefore, the power $P_S^2+2P_SP_{IMD3}$ of the first reference signal SR1 increases significantly; however, when the gain TG is too large, the linearity of the transmission gain units 1041 and 1042 would get worse and the power of the IMD signals would increase, thereby causing a significant increase in the power $P_{IMD3}^2$ of the second reference signal SR. Therefore, the present invention uses the first reference signal SR1 and the second reference signal SR2 as the indicators for gain calibration; specifically, the purpose of the gain calibration unit 126 is to increase the power of the first reference signal SR1 while at the same time not making the power of the second reference signal SR2 too large.

Figure 6:
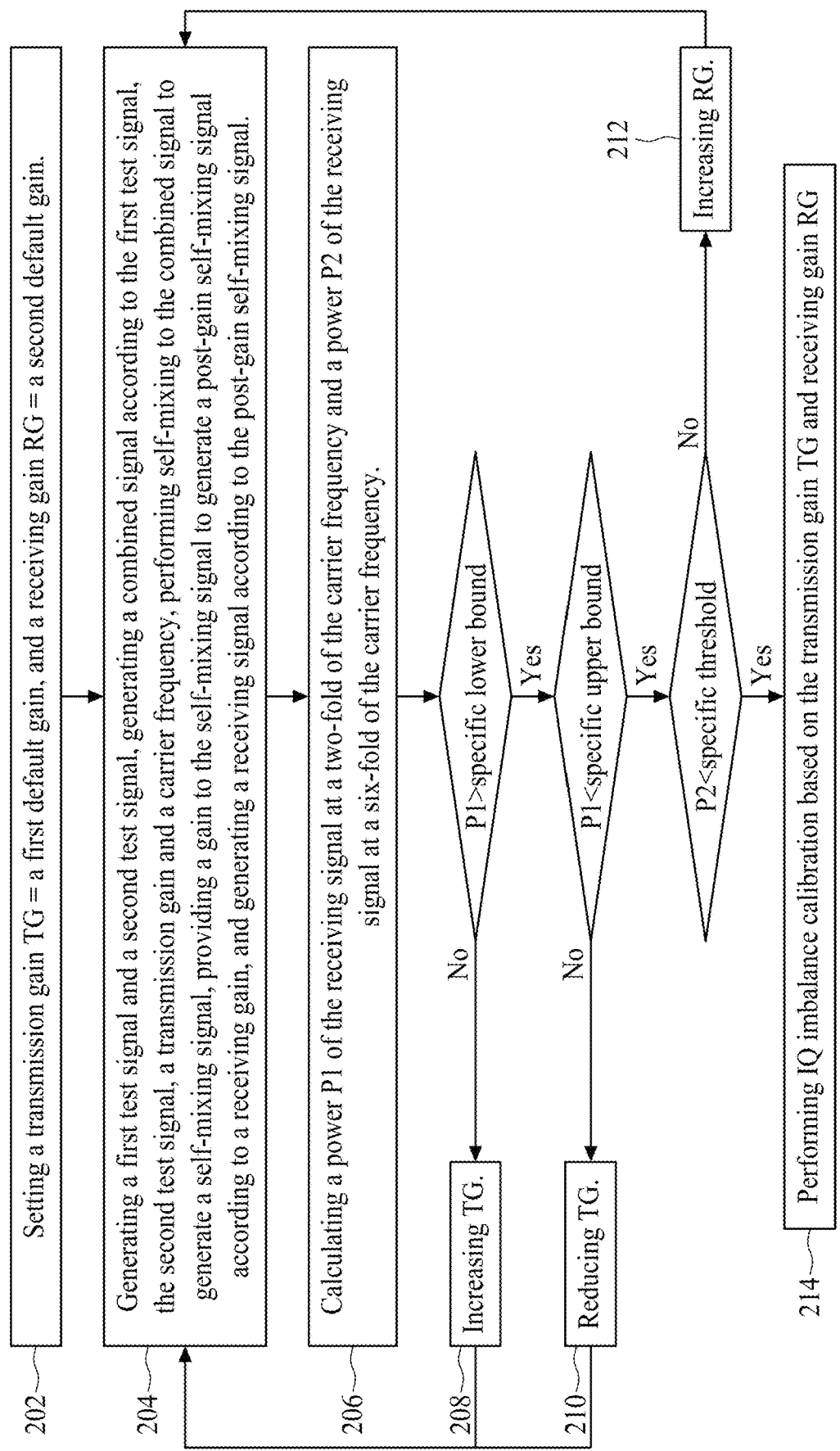
FIG. 6 is a flow chart illustrating a calibration method according to embodiments of the present application.

In the following, the manner in which the gain calibration unit 126 controls the transmission gain units 1041 and 1042 and the receiving gain unit 1201 will be described in detail. FIG. 6 is a flow chart illustrating a calibration according to embodiments of the present application. First, in step 202, the transmission gain TG is set as a first default gain, and the receiving gain RG is set as a second default gain. In step 204, the calibration signal generation unit 101 generates test signals s1 and s2 the digital-to-analog converters 1021 and the 1022 respectively perform digital-to-analog conversion to signals s1 and s2, thereby obtaining signals sa1 and sa2; the transmission gain units 1041 and 1042 respectively provide a gain to signals sa1 and sa2 according to the transmission gain TG, so as to generate signals sg1 and sg2; the up-converters 1061 and 1062 respectively up-convert signals sg1 and sg2 into signals sc1 and sc2 according to the carrier angular frequency ωc; the combiner 108 combines the signals sc1 and sc2 into a combined signal sm. Next, the self-mixer 114 perform self-mixing to the combined signal sm and generates self-mixing signal ss; the receiving gain unit 1201 provides a gain to the self-mixing signal ss according to the receiving gain RG so as to generate a post-gain self-mixing signal ssg; and then the analog-to-digital converter 1221 performs analog-to-digital conversion to the post-gain self-mixing signal ssg to obtain a receiving signal sr.

In step 206, the Fourier transformer 122 calculates the power P1 of a first reference signal SR1 of the receiving signal sr at the two-fold of the carrier angular frequency ωbb, and the power P2 of a second reference signal SR2 of the receiving signal sr at the six-fold of the carrier angular frequency ωbb. When the power P1 is not greater than a default specific lower bound LB, it means that the power of the two-tone main signals S is not high enough, then, the method proceeds to step 208 to increase the transmission gains TG of the transmission gain units 1041 and 1042, and then steps 204 to 206 are repeated; when the power P1 is greater than the specific lower bound LB, and the power P1 is not less than a default specific upper bound UB, it means that the power of the two-tone main signals S is too large, then, the method proceeds to step 210 to reduce the transmission gains TG of the transmission gain units 1041 and 1042, and then steps 204 to 206 are repeated; when the power P1 is greater than the specific lower bound LB, and the power P1 is less than the specific upper bound UB, and the power P2 is not less than a specific threshold TH, it means that the power of the two-tone main signals S is appropriate but the linearity is poor, then the method proceeds to step 212 to increase the receiving gain RG of the receiving gain unit 1201, and then steps 204 to 206 are repeated; since the receiving gain RG has been increased, after repeating steps 204 to 206, the transmission gain TG can be reduced correspondingly, so as to address the issue of poor linearity of the transmission gain units 1041 and 1042 due to the excess transmission gain TG. When the power P1 is greater than the specific lower bound LB, the power P1 is less than the specific upper bound UB, and the power P2 is less than the specific threshold TH, then the gain calibration of the gain calibration mode is accomplished.

Next, the transceiver 100 enters into the IQ calibration mode, e.g., in step 214, it performs IQ imbalance calibration based on the gain-calibrated transmission gain TG and receiving gain RG so as to calibrate the phase and/or amplitude mismatch between the in-phase signal transmission path and the orthogonal signal transmission path and/or between the in-phase signal receiving path and the orthogonal signal receiving path; then, the transceiver 100 enters into the normal mode. Since the gain calibration mode is carried out before the IQ calibration mode, the linearity and signal-to-noise ratio of the transceiver 100 fall within a default range, and hence, the effect of IQ imbalance calibration can be improved.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A transceiver, comprising:
    a calibration signal generation unit, configured to generate a first test signal and a second test signal to a transmission unit in a gain calibration mode;
    the transmission unit, configured to generate a combined signal according to the first test signal, the second test signal and a transmission gain, wherein the transmission unit includes:
        a first digital-to-analog converter, configured to perform digital-to-analog conversion to the first test signal to obtain a first analog signal;
        a second digital-to-analog converter, configured to perform digital-to-analog conversion to the second test signal to obtain a second analog signal;
        a first transmission gain unit, configured to provide a gain to the first analog signal according to the transmission gain so as to generate a first post-gain signal;
        a second transmission gain unit, configured to provide a gain to the second analog signal according to the transmission gain so as to generate a second post-gain signal;
        a self-mixer, configured to perform self-mixing to the combined signal to generate a self-mixing signal;
    a receiving unit, configured to generate a receiving signal according to the self-mixing signal;
    a first Fourier transformer, configured to calculate a power of the receiving signal at a specific frequency; and
    a gain calibration unit, configured to adjust the transmission gain according to the power of the specific frequency in the gain calibration mode.

2. The transceiver of claim 1, wherein the first test signal and the second test signal cause the combined signal to have two-tone main signals in the gain calibration mode.

3. The transceiver of claim 2, wherein the transmission unit further comprises:
    a first up-converter, configured to up-convert the first post-gain signal to a first up-converted signal according to a carrier frequency;
    a second up-converter, configured to up-convert the second post-gain signal to a second up-converted signal according to the carrier frequency; and
    a combiner, configured to combine the first up-converted signal and the second up-converted signal into the combined signal.

4. The transceiver of claim 3, wherein the specific frequency comprises two-fold of the carrier frequency.

5. The transceiver of claim 4, wherein when a power of the two-fold of the carrier frequency is not greater than a specific lower bound, the gain calibration unit increases the transmission gain.

6. The transceiver of claim 5, wherein when the power of the two-fold of the carrier frequency is not less than a specific upper bound, the gain calibration unit further reduces the transmission gain.

7. The transceiver of claim 6, wherein the receiving unit comprises:
    a first receiving gain unit, configured to provide a gain to the self-mixing signal according to a receiving gain so as to generate a post-gain self-mixing signal; and
    a first analog-to-digital converter, configured to perform analog-to-digital conversion to the post-gain self-mixing signal to obtain the receiving signal.

8. The transceiver of claim 7, wherein the specific frequency further comprises six-fold of the carrier frequency.

9. The transceiver of claim 8, wherein when a power of the six-fold of the carrier frequency is not less than a specific threshold, the gain calibration unit further increases the receiving gain.

10. The transceiver of claim 7, wherein the transmission unit further comprises:
    a first amplifier, coupled to the combiner; and
    a first antenna, coupled to the first amplifier and configured to generate a transmission signal; and
    the receiving unit further comprises:
        a second antenna, configured to receive the transmission signal in a normal mode;
        a first down-converter, coupled to the second antenna, wherein the first receiving gain unit receives a signal from the first down-converter in the normal mode;
        a second down-converter, coupled to the second antenna;
        a second receiving gain unit, coupled to the second down-converter;
        a second analog-to-digital converter, coupled to the second receiving gain unit; and
        a second Fourier transformer, coupled to the second analog-to-digital converter.

11. A transceiver calibration method, comprising:
    generating a first test signal and a second test signal in a gain calibration mode;

generating a combined signal according to the first test signal, the second test signal and a transmission gain, including:
  performing digital-to-analog conversion to the first test signal to obtain a first analog signal;
  performing digital-to-analog conversion to the second test signal to obtain a second analog signal;
  providing a gain to the first analog signal to generate a first post-gain signal according to the transmission gain;
  providing a gain to the second analog signal to generate a second post-gain signal according to the transmission gain;
performing self-mixing to the combined signal and generating a self-mixing signal;
generating a receiving signal according to the self-mixing signal;
calculating a power of the receiving signal at a specific frequency; and
adjusting the transmission gain mode according to the power of the specific frequency in the gain calibration mode.

12. The method of claim 11, wherein in the gain calibration mode, the first test signal and the second test signal cause the combined signal to have two-tone main signals.

13. The method of claim 12, wherein the generating the combined signal according to the first test signal, the second test signal and the transmission gain further comprises:
  up-converting the first post-gain signal into a first up-converted signal according to carrier frequency;
  up-converting the second post-gain signal into a second up-converted signal according to the carrier frequency; and
  combining the first up-converted signal and the second up-converted signal into the combined signal.

14. The method of claim 13, wherein the specific frequency includes two-fold of the carrier frequency.

15. The method of claim 14, wherein the adjusting the transmission gain according to the power of the specific frequency comprises:
  increasing the transmission gain when a power of the two-fold of the carrier frequency is not greater than a specific lower bound.

16. The method of claim 15, wherein the adjusting the transmission gain according to the power of the specific frequency further comprises:
  reducing the transmission gain when the power of the two-fold of the carrier frequency is not less than a specific upper bound.

17. The method of claim 16, wherein the generating the receiving signal according to the self-mixing signal comprises:
  providing a gain to the self-mixing signal to generate a post-gain self-mixing signal according to a receiving gain; and
  performing analog-to-digital conversion to the post-gain self-mixing signal to receive the receiving signal.

18. The method of claim 17, wherein the specific frequency further comprises six-fold of the carrier frequency.

19. The method of claim 18, wherein the adjusting the transmission gain according to the power of the specific frequency further comprises:
  increasing the receiving gain when a power of the six-fold of the carrier frequency is not less than a specific threshold.

20. The method of claim 19, further comprising:
  performing IQ imbalance calibration based on the transmission gain and the receiving gain when the power of the two-fold of the carrier frequency is greater than the specific lower bound and less than the specific upper bound, and the power of the six-fold of the carrier frequency is not less than the specific threshold.

* * * * *